(12) United States Patent
Weinstein et al.

(10) Patent No.: US 8,525,502 B2
(45) Date of Patent: Sep. 3, 2013

(54) DIGITAL PULSE-FREQUENCY MODULATION CONTROLLER FOR SWITCH-MODE POWER SUPPLIES WITH FREQUENCY TARGETING AND ULTRASONIC MODES

(75) Inventors: Jason Weinstein, Toronto (CA); Zhenyu Zhao, Burlington (CA); Jingquan Chen, San Jose, CA (US)

(73) Assignee: Exar Corporation, Fremont, CA (US)

( * ) Notice: Subject to any disclaimer, the term of this patent is extended or adjusted under 35 U.S.C. 154(b) by 261 days.

(21) Appl. No.: 13/039,154

(22) Filed: Mar. 2, 2011

(65) Prior Publication Data

US 2012/0223691 A1   Sep. 6, 2012

(51) Int. Cl.
*G05F 1/00* (2006.01)

(52) U.S. Cl.
USPC ........... 323/283; 323/271; 323/274; 323/282; 323/284

(58) Field of Classification Search
USPC ................. 323/222–225, 282–286, 299–303, 323/271–275
See application file for complete search history.

(56) References Cited

U.S. PATENT DOCUMENTS

| | | | | |
|---|---|---|---|---|
| 5,349,273 A * | 9/1994 | Pacholok | | 315/307 |
| 5,657,215 A * | 8/1997 | Faulk | | 363/41 |
| 6,759,888 B1 * | 7/2004 | Wodnicki | | 327/382 |
| 7,161,816 B2 * | 1/2007 | Shteynberg et al. | | 363/21.13 |
| 7,586,767 B1 * | 9/2009 | Prodic et al. | | 363/65 |
| 7,622,820 B1 * | 11/2009 | Prodic et al. | | 307/31 |
| 7,679,938 B2 * | 3/2010 | Ye et al. | | 363/21.12 |
| 2007/0041224 A1 * | 2/2007 | Moyse et al. | | 363/21.01 |
| 2007/0064358 A1 * | 3/2007 | Murata et al. | | 361/18 |
| 2007/0069703 A1 * | 3/2007 | Kokubun et al. | | 323/282 |
| 2009/0079408 A1 * | 3/2009 | Qiao et al. | | 323/283 |
| 2009/0174379 A1 * | 7/2009 | Lima et al. | | 323/282 |
| 2009/0206814 A1 * | 8/2009 | Zhang et al. | | 323/284 |
| 2009/0218994 A1 * | 9/2009 | Liu et al. | | 323/234 |
| 2009/0295341 A1 * | 12/2009 | Nakamura et al. | | 323/222 |
| 2010/0109625 A1 * | 5/2010 | Ohtake et al. | | 323/282 |
| 2010/0164455 A1 * | 7/2010 | Li et al. | | 323/283 |
| 2010/0172160 A1 * | 7/2010 | Ye et al. | | 363/21.18 |
| 2010/0308784 A1 * | 12/2010 | Scoones et al. | | 323/282 |
| 2011/0127981 A1 * | 6/2011 | Miyamae | | 323/282 |
| 2011/0227549 A1 * | 9/2011 | Huang et al. | | 323/282 |
| 2012/0019224 A1 * | 1/2012 | Lima et al. | | 323/282 |
| 2012/0153919 A1 * | 6/2012 | Garbossa et al. | | 323/284 |

OTHER PUBLICATIONS

International Searching Authority, International Search Report and Written Opinion for PCT International application No. PCT/US2012/027558, Jun. 28, 2012, 11 pages.

* cited by examiner

*Primary Examiner* — Bao Q Vu
*Assistant Examiner* — Yusef Ahmed (57) ABSTRACT

A digital pulse controller uses digital logic to send pulses to a high side and low side switches of a switch-mode power supply converter. The digital logic uses a pulse frequency mode which includes a frequency targeting mode and an ultrasonic mode. The frequency targeting mode dynamically adjusts the size of the pulses in order to achieve a switching frequency within a desired band. The ultrasonic mode is switched into when the frequency of the pulses are at or below a threshold and the time of the pulses reaches a minimum threshold.

27 Claims, 5 Drawing Sheets

DIGITAL PULSE-FREQUENCY MODULATION CONTROLLER FOR SWITCH-MODE POWER SUPPLIES WITH FREQUENCY TARGETING AND ULTRASONIC MODES

BACKGROUND

With a traditional pulse-frequency modulated (PFM) controller, switching pulses with a fixed size are sent whenever the output voltage of the power supply drops below a defined threshold. The switching frequency will thus depend on the magnitude of the load (a heavier load will result in a higher pulse frequency). This method of control allows for a high efficiency to be achieved during light load conditions compared to pulse-width modulation (PWM) since a low pulse frequency will result in reduced switching losses.

Since the switching frequency of a traditional PFM controller depends on the magnitude of the load, the frequency can vary to a large degree. An undesirable condition can occur when the switching frequency enters a band that is audible to the human ear (20 kHz or less). When the frequency falls into this range, the switching action of the power supply can sometimes become audible. As a result, designers often need to sacrifice the high efficiency of PFM operation for PWM in order to avoid audible switching noise.

On the other hand, as the load becomes heavier, the switching frequency increases with a fixed pulse width. As a result, the switching losses increase proportionally to the load. Furthermore, if the controller is implemented digitally, more frequent PFM logic operations will result in lower efficiency in the controller.

SUMMARY

In one embodiment, the Pulse Frequency Modulation mode includes a frequency targeting mode that generally provides for conventional PFM operation and an ultrasonic mode. The ultrasonic mode keeps the high and low side pulse frequency above an audible frequency range under light load conditions. In the ultrasonic mode, the ratio of the high side pulse on time to the low side pulse on time can be lower than this ratio for the frequency targeting mode and thus, in the ultrasonic mode, a reduced amount of charge is provided for a given pulse on time.

An ultrasonic mode comparator can use a higher than normal reference voltage to control the ultrasonic mode at light load operating conditions. A normal PFM comparator can use the normal reference voltage and be used to determine when the output voltage has dropped such that operation in the frequency targeting mode, rather than the ultrasonic mode, is desirable.

The frequency targeting mode can have a force pulse operation to ensure that the frequency does not drop into the audible range even temporarily and to quicken the transition into the ultrasonic mode.

DETAILED DESCRIPTION OF THE INVENTION

Figure 1:
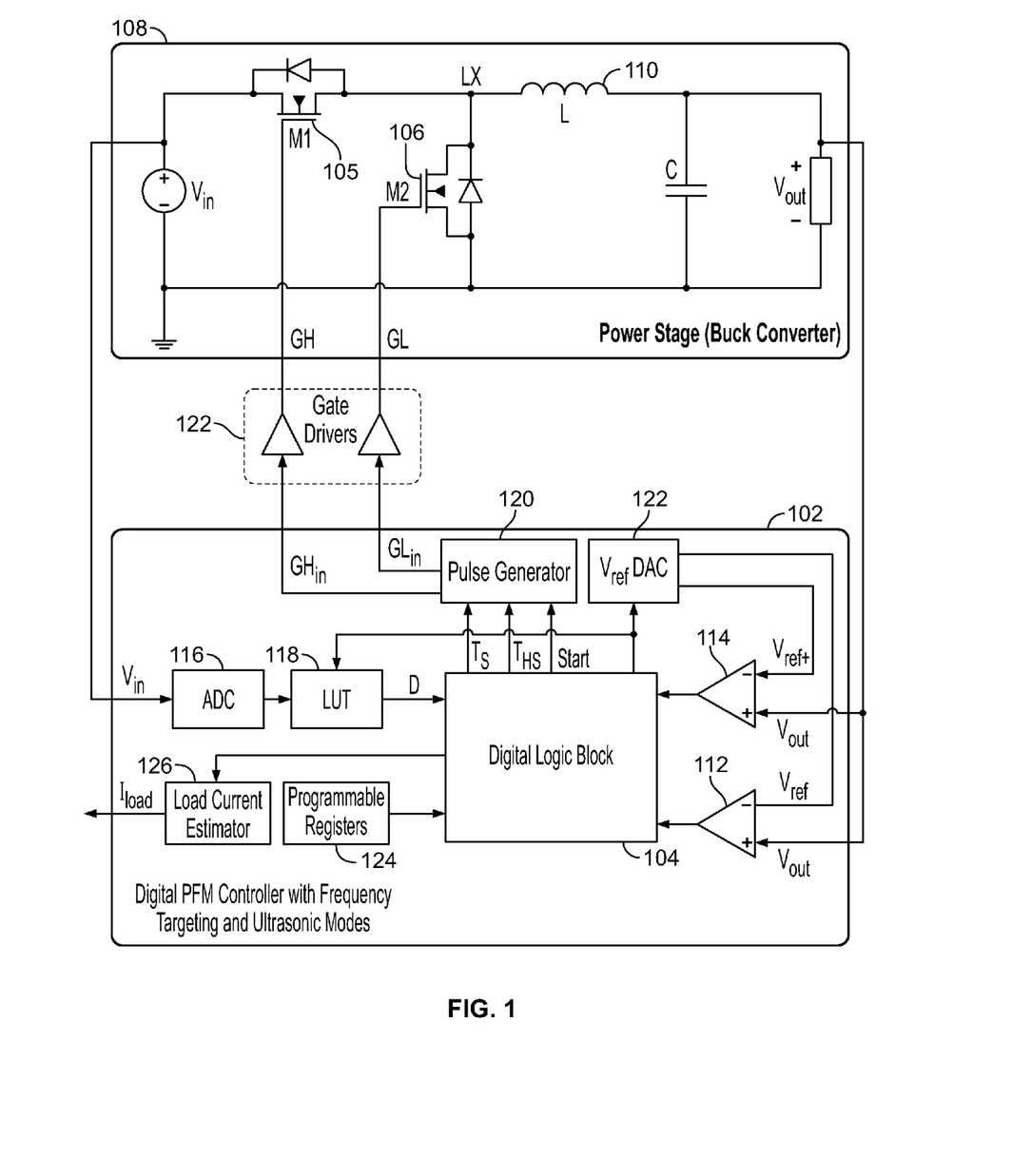
FIG. 1 is a system diagram of one embodiment of the present invention.

A digital pulse controller 102 includes digital logic 104 to send pulses to a high side switch 105 and low side switch 106 of a synchronous buck converter 108. With modifications to controller 102, the buck converter 108 can be replaced with any other suitable power supply topology, such as, but not limited to a boost converter. The digital logic 104 uses a pulse frequency mode which includes a frequency targeting mode and an ultrasonic mode. The ultrasonic mode is switched into when the frequency of the high side and low side pulses is at or below a frequency threshold and the on time of the pulses reaches a minimum threshold.

The ultrasonic mode can be a selectable mode in which the ultrasonic mode is only switched into when the ultrasonic mode is enabled.

In one embodiment, in the ultrasonic mode, the pulse for the low side switch 106 is on for such a time that an inductor current at the inductor 110 of converter 108 may go negative. This can allow for the on-time of the pulses to be kept above a minimum value while providing small amounts or even negative amounts of charge.

The frequency targeting mode can have the pulses such that the inductor current at the inductor 110 of converter 108 is positive and goes to zero at the end of the low side pulse. This prevents any unnecessary power waste. The input voltage sampled with ADC 116 can be used to ensure that the on times of the high side and low side pulses will result in the inductor current going to zero at the end of the low side pulse.

A Pulse Frequency Modulator (PFM) comparator 112 can compare a converter output voltage to a first reference voltage ($V_{ref}$) and an ultrasonic mode comparator 114 can compare the converter output voltage to a second higher reference voltage ($V_{ref+}$).

The digital pulse controller 102 can go into the frequency targeting mode from the ultrasonic mode when the PFM comparator 112 shows that the converter output voltage is less than the first reference voltage ($V_{ref}$).

The ultrasonic mode comparator 114 can be used to adjust the ratio of the high side pulse on-time to low side pulse on-time in the ultrasonic mode. For a buck converter, in the ultrasonic mode, if the output voltage is above the second reference voltage ($V_{ref+}$), the ratio is decreased and if the output voltage is below the second reference voltage ($V_{ref+}$), the ratio is increased.

For a boost converter, because of the arrangement of the high side and low side switches, in the ultrasonic mode, the opposite is true (if the output voltage is above the second reference voltage, the ratio is increased and if the output voltage is below the second reference voltage, the ratio is decreased).

The ratio can be adjusted by changing the high side on time while leaving the total on time constant; changing the high side on time while leaving the low side on time constant; or by changing the total on time while leaving the high side on time constant.

In the frequency targeting mode, as load increases, the total pulse on time of the high side and low side pulses (Ts) increases to maintain frequency below upper frequency ($f_{pmax}$) and, as the load decreases, Ts decreases to maintain frequency above a lower frequency ($f_{pmin}$) until Ts saturates to a minimum allowable value.

The pulse sizes are saturated between a minimum and a maximum value. Data on the measured switching frequency and pulses sizes can be used to estimate the load current.

A pulse width modulation (PWM) comparator (not shown) can be used to compare the output voltage to a third reference voltage ($V_{ref}$) that is less than the first reference voltage ($V_{ref}$). This can be done to determine when the controller should transition from PFM mode to PWM mode.

The PFM comparator 112 can be used to initiate pulses in the frequency targeting mode.

The frequency threshold can be such that the frequency of the pulses does not cause an audible sound.

In the frequency targeting mode there can be a force pulse operation, in the force pulse operation, a pulse is forced when the period between two pulses reaches the maximum threshold. The force pulse operation can be selectable. Force pulse operation can prevent the frequency from going into the audible range even temporarily.

A ratio of the high side pulse on-time to low side pulse on-time is kept fixed in the frequency targeting mode for a fixed input voltage. The ratio is updated as the input voltage changes.

In one embodiment, the pulses are maintained to be greater than a minimum width.

A mode transition dead zone time can be used to prevent a switch to the frequency targeting mode from the ultrasonic mode during the dead zone time after the pulses are sent to the high and low side switches 105 and 106. The mode transition dead zone time prevents the switching of the mode due to noise.

A pulse dead zone is used following the generation of each switching pulse to avoid sending a subsequent pulse too quickly. The pulse dead zone and the mode transition dead zone are independently selectable.

In the frequency targeting mode, an interval between pulses is measured, and if the interval is found to the within a desired frequency band, the pulse size remains the same for the following switching cycle. If the interval is found to be below the desired frequency band, the pulse size is decreased for the following switching cycle. If the interval is found to be above the desired frequency band, the pulse size is increased for the following switching cycle.

Details of one exemplary non-limiting example are given below.

The analog-to-digital converter (ADC) 116 is used for sampling $V_{in}$, the input voltage of the power supply. The output of the ADC 116 is sent to the Steady-State Duty Ratio Look-Up Table (LUT) 118.

This LUT 118 is used to convert the output of the ADC 116 into a digital value corresponding to the steady-state duty ratio corresponding to the operating point of the converter. It can be implemented as digital logic that maps $V_{in}$ and $V_{out}$ to the steady-state duty ratio, D, which can be calculated as shown in equation (1). This relationship corresponds to a buck converter. For other converter topologies, the relationship can be different.

$$D = \frac{V_{out}}{V_{in}} \quad (1)$$

Figure 3:
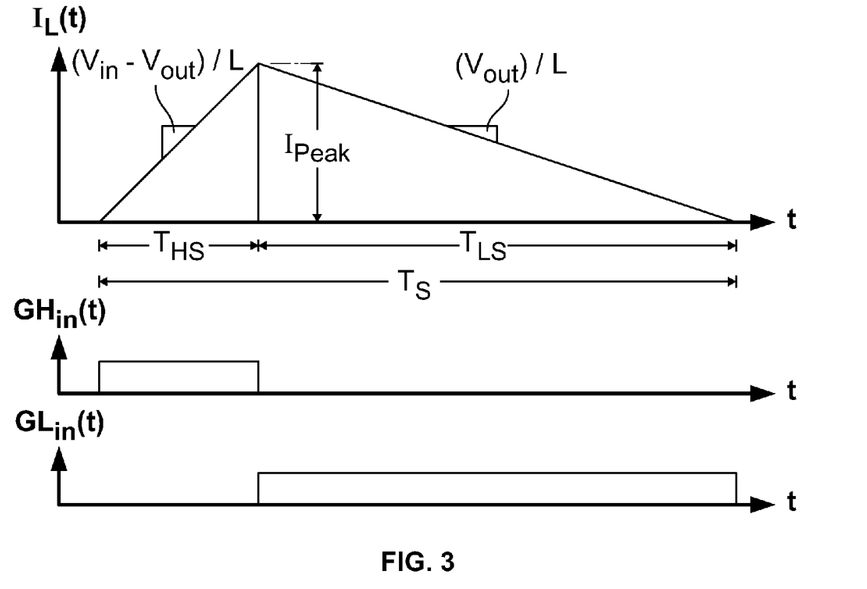
FIG. 3 is a timing diagram of a single Pulse Frequency Mode (PFM) pulse during Frequency Targeting Mode (FTM).

This value is used by the Digital Logic Block 104 to calculate the sizes of the PFM pulses. As shown in FIG. 3, the duty ratio can be used to size the pulses such that the inductor current reaches zero when the low-side signal goes low.

The Pulse Generator 120 is responsible for producing timed pulses that are sent to the gate driver 122 of the power stages. The sizes of these pulses, representing the on-times of the high-side and low-side switches 105 and 106, are generated as digital values from the Digital Logic Block 104. The Digital Logic Block 104 also sends a start signal to the Pulse Generator 120, indicating when each PFM should be sent. The Pulse Generator 120 is capable of producing large dead-time periods (where both the high-side and low-side signals are low) in order to support PFM operation.

Two comparators 112 and 114 are used for regulating the output of the power stage during PFM operation. The first comparator 112 has a reference value equal to the desired output voltage, $V_{ref}$. The second comparator 114 has a reference referred to as $V_{ref+}$ that is slightly above $V_{ref}$ (for example, a few percent larger than $V_{ref}$). The second comparator 114 is used for regulating the output during Ultrasonic mode, while the first comparator 112 is used during Frequency Targeting mode. The references to both comparators are established using a Programmable Digital-to-Analog Converter (DAC) 122. The input of the DAC 122 depends on outputs from the Programmable Registers.

In a traditional pulse-frequency modulation controller, a high-side and a low-side pulse is sent each time the output voltage drops below the reference voltage. The sizes of the pulses are fixed. As a result, the frequency of the pulses is proportional to the load current. With a high load current, the frequency of the pulses will saturate to the upper limit of the controller, and as the load current approaches zero the pulse frequency will also approach zero. The Digital Logic Block 104 is a modification of a traditional digital pulse-frequency modulation controller. In this control method, the sizes of the PFM pulses are varied in order to achieve a switching frequency within a desired range.

The purpose of the Digital Logic block 104 is to dynamically adjust the sizes of PFM pulses in order to achieve a pulse frequency within a desired band. The controller operates in two modes: Frequency Targeting mode and Ultrasonic mode. When PFM mode begins, the controller 102 starts in Frequency Targeting mode. In this mode a pulse is sent each time $V_{out}$, the converter output voltage, drops below $V_{ref}$, the comparator reference, as is the case with a conventional PFM controller.

Figure 2:
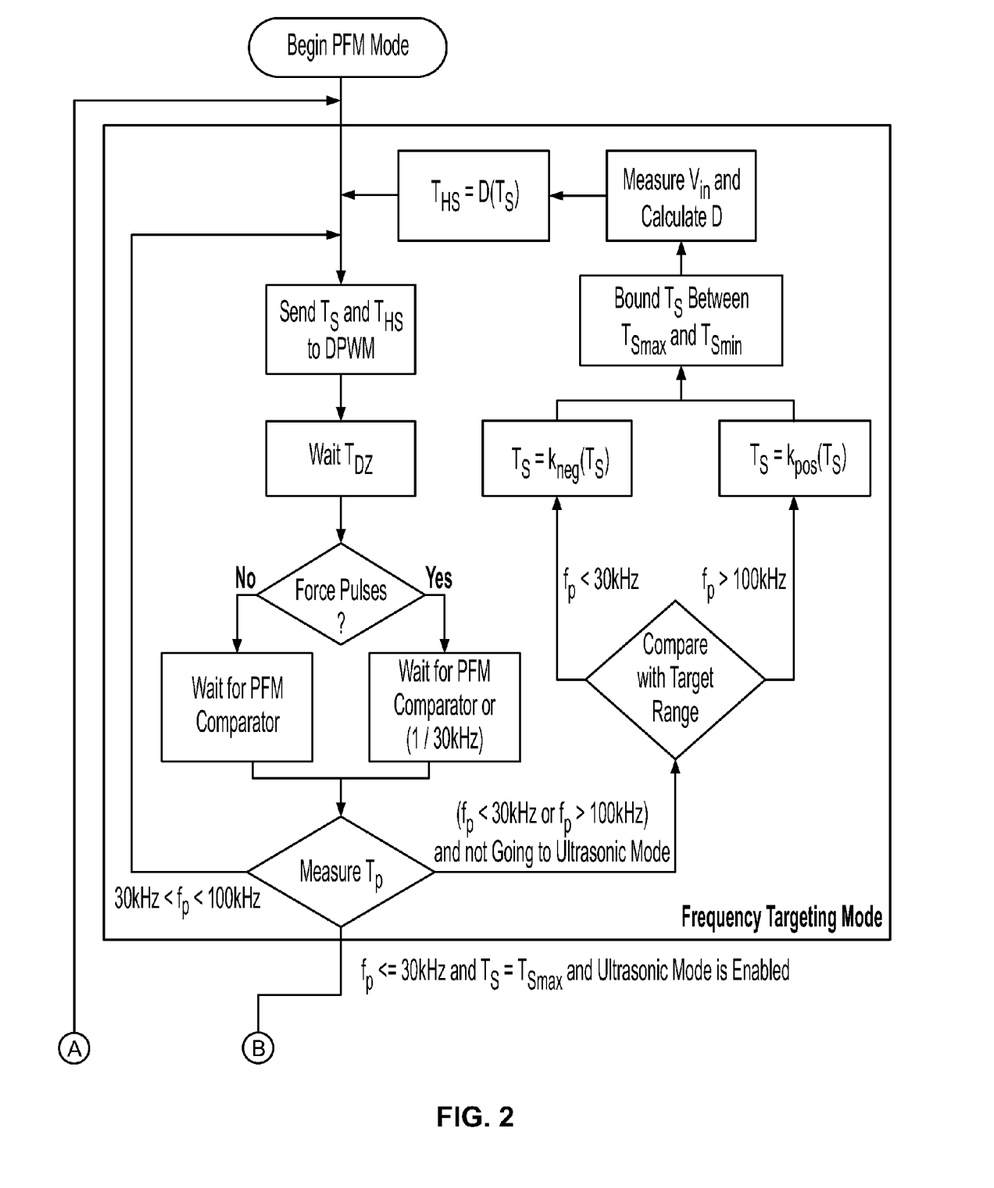
FIG. 2 is a flowchart showing exemplary frequency targeting and ultrasonic modes.

A method for the Frequency Targeting mode is shown in the top half of FIG. 2. After the start of each pulse, a counter is used as a timer. The counter measures the time period from when a pulse is sent until the next pulse needs to be sent (due to the comparator triggering), T. The length of this time period is approximately inversely proportional to the load current when the load is constant for a given pulse width. At this point, the controller compares the corresponding switching frequency, $f_p$ (the inverse of $T_p$), to the desired frequency range, between $f_{pmin}$ and $f_{pmax}$. In the flowchart of FIG. 2, $f_{pmin}$ and $f_{pmax}$ are defined as 30 kHz and 100 kHz, ensuring that the frequency remains above the audible band and low enough so that efficiency is not degraded. However, these thresholds are programmable and as such the targeted frequency band can be set to any range suitable for the application. If $T_p$ corresponds to a frequency within the desired frequency band, $T_S$ (the total of the high-side and low-side on-times) remains constant and another PFM pulse is sent.

If, on the other hand, $f_p$ is either above or below the desired frequency band, $T_S$ is adjusted for $f_p$ to remain in band. If $f_p$ is below the band (e.g., $f_p$<30 kHz), $T_S$ is reduced. In this case, $T_S$ is multiplied by $k_{neg}$, a value smaller than 1, to determine the new value of $T_S$. If $f_p$ is above the band (e.g., $f_p$>100 kHz), $T_S$ is enlarged. In this case, $T_S$ is multiplied by $k_{pos}$, a value greater than 1, to determine the new value of $T_S$. The relationship between $T_s$, and $f_p$ will be shown in equation (11).

$T_S$ is then saturated so that it always falls between $T_{Smax}$ and $T_{Smin}$. $T_S$ should be greater than a certain threshold for several practical reasons. A digital pulse generator has finite resolution and therefore cannot produce an infinitesimally small duty ratio. Also, the gate drivers and switches will require a pulse of a minimum width in order to properly turn on. If the pulse is too short, it may be filtered out, resulting in no switching action in the power stage. Although removing pulses in this fashion could allow the output voltage to be properly regulated, the missing pulses will result in a lower effective frequency, which could enter the audible band. On the other hand, the digital logic cannot be designed for the Pulse Generator to produce an infinitely large pulse, so there is an upper bound on the pulse size. Furthermore, limiting the pulse size restricts the output voltage ripple.

Next, the calculations for on times are described. Before each PFM pulse is sent, the converter input voltage is measured in order to determine the size of $T_{HS}$. The input voltage is measured by the ADC 116 and the ADC's output is fed into the LUT 118. The LUT 118 produces a value corresponding to the steady state duty ratio according to equation (1). Once the values for $T_S$ and D have been determined, $T_{HS}$ can be calculated as follows for a buck converter:

$$T_{HS}=DT_S \quad (2)$$

As shown in FIG. 3, when the ratio between $T_{HS}$ and $T_S$ is equal to D for the case of a buck converter, the low-side will turn off right when the inductor current, $I_L$, falls to zero under ideal conditions. This ensures that any diode conduction in the low-side switch is minimized, increasing the converter's efficiency. As $V_{in}$ varies, the on-times will be adjusted to ensure that the shut-off point of the low-side switch approximately corresponds with when $I_L$ reaches zero. $T_{LS}$, the low-side on-time is determined as follows for a buck converter:

$$T_{LS}=T_S-T_{HS}=(1-D)T_S \quad (3)$$

Figure 4:
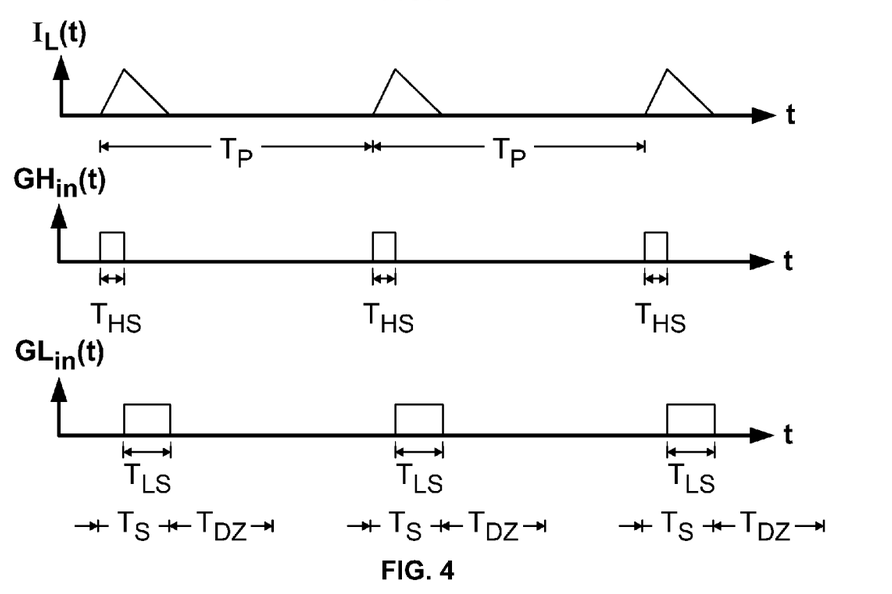
FIG. 4 is a timing diagram showing a series of PFM pulses for a constant load current.

The digital values of the high-side and low-side on-times are then sent to the Pulse Generator, which outputs pulses of the appropriate sizes. The process repeats itself and the controller monitors the reference comparator output to determine when the next PFM pulse should be sent. Dead-time is not illustrated in FIG. 3 for simplicity, but it should be included in order to avoid shoot-through and achieve higher efficiency. FIG. 4 illustrates a series of pulses during steady-state operation.

After each PFM pulse is sent, the controller will wait a certain period of time before sampling the reference comparator output. This period of time, $T_{DZ}$, is referred to as the pulse dead zone. The purpose of the pulse dead-zone is to ensure that the inductor current is always zero at the beginning of each PFM pulse, guaranteeing that the converter operates in discontinuous conduction mode. Although the measurement of $V_{in}$ should prevent this from occurring, in which case a pulse dead zone would be unnecessary for ensuring the inductor current is zero before the next pulse, it's possible that quantization errors or delays could render the calculations inaccurate. Another purpose of the pulse dead-zone is to avoid sending pulses due to switching noise.

The theoretical basis of the frequency targeting process is shown next. These calculations are specifically for a buck converter topology. For other converter topologies, the relationships would need to be modified according to the specific converter configuration. The relationship between $T_S$ and a DC load current, $I_{LOAD}$, can be found as follows:

$$T_{peak} = T_{HS} \frac{V_{in} - V_{out}}{L} \quad (4)$$

$$avg(I_L) = \frac{1}{2} T_{peak} \frac{T_s}{T_p} \quad (5)$$

$$avg(I_L) = \frac{1}{2}\left(T_{HS} \frac{V_{in} - V_{out}}{L}\right) \frac{T_s}{T_p} \quad (6)$$

$$T_{HS} = DT_s = \frac{V_{out}}{V_{in}} T_s \quad (7)$$

$$avg(I_L) = \frac{V_{out} T_s^2}{2 V_{in} T_p}\left(\frac{V_{in} - V_{out}}{L}\right) \quad (8)$$

$$avg(I_L) = \frac{f_p V_{out} T_s^2}{2 V_{in}}\left(\frac{V_{in} - V_{out}}{L}\right) \quad (9)$$

$$avg(I_L) = I_{LOAD} \quad (10)$$

$$f_p = \frac{2L V_{in} I_{LOAD}}{V_{out} T_s^2 (V_{in} - V_{out})} \quad (11)$$

As these calculations show, the frequency of the pulses, $f_p$, is inversely proportional to $T_S^2$ for a given load and set of converter parameters. When the load increases such that $f_p$ falls outside of the desired frequency band, the controller changes $T_S$ in order to alter the effective $f_p$. If the load increases such that $f_p$ becomes too large, the controller will increase $T_S$ so that each pulse delivers more energy, reducing the pulse frequency. On the other hand, when the load becomes small such that $f_p$ enters the audible range, the controller decreases $T_S$ so that each pulse delivers less energy, increasing the pulse frequency. The modulation of the pulse sizes is done incrementally, without the controller needing to know any of the dynamic system conditions or solve equation (11). In practical applications the load current, $I_{LOAD}$, will not be constant. In these cases, the controller will dynamically adjust $T_S$ in order to achieve a switching frequency within the desired range.

If the load becomes very small and $f_p$ drops below $f_{pmin}$ when $T_S$ is equal to $T_{Smin}$, the controller will transition to Ultrasonic mode (if it has been enabled). This will ensure operation at a frequency above the audible band. If the load becomes large and $f_p$ increases above $f_{pmax}$ when $T_S$ is equal to $T_{Smax}$, the controller will be unable to do anything to reduce the frequency further. However, in such a scenario, a multi-mode PWM/PFM controller would bring back the mode into PWM operation.

As mentioned above, there is a practical limitation on the minimum pulse size that can be sent due to the Pulse Generator implementation, the gate drivers, and the switches. As a result, when $I_{LOAD}$ approaches zero, the pulse size can only decrease to a certain value specified as $T_{Smin}$. If the load becomes very light, it's possible that pulses of this size could result in a switching frequency in the audible band (e.g., below 20 kHz). To cope with this situation, Ultrasonic mode can be enabled.

During Ultrasonic mode, the output voltage is regulated to $V_{ref+}$, a level that is slightly larger than the standard PFM reference, $V_{ref}$. This is done in order to allow for the condition for transitioning back into Frequency Targeting mode. When the load increases enough such that the output voltage decreases below $V_{ref}$, the controller will change the mode back to Frequency Targeting mode. The second comparator allows for detecting when the controller should exit Ultrasonic mode. Pulses are sent at a fixed frequency of $f_{pmin}$. The combined period of the high-side and low-side on-times, $T_S$, remains constant. The high-side and low-side on-times, however, vary in order to regulate the voltage at $V_{ref+}$. During Frequency Targeting mode, the channel will enter Ultrasonic mode when the following conditions are met:

Ultrasonic mode is enabled $T_S$ has been saturated to $T_{Smin}$

The measured frequency, $f_p$, is lower than $f_{pmin}$

Figure 5:
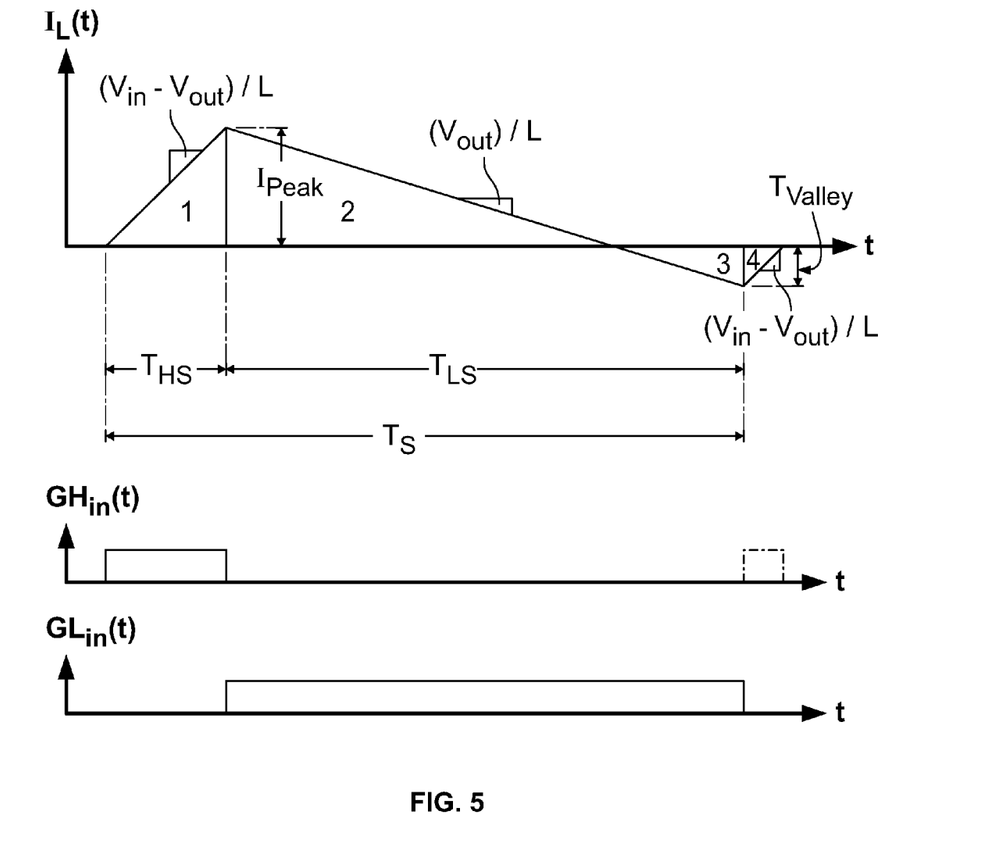
FIG. 5 is a timing diagram of a single PFM pulse during ultrasonic mode.

The operation of the controller during Ultrasonic mode is illustrated in FIG. 2. A timing diagram of an ultrasonic pulse is shown in FIG. 5. In Ultrasonic mode, pulses are sent at a fixed frequency of $f_{pmin}$. Before a pulse is sent, the controller samples the Ultrasonic comparator to determine whether the $V_{out}$ is above or below $V_{ref+}$. If $V_{out}$ is above $V_{ref+}$, the high-side on-time, $T_{HS}$, is decreased by the Ultrasonic increment value, $T_{USincr}$. If $V_{out}$ is below $V_{ref+}$, $T_{HS}$ is increase by $T_{USincr}$. In either case, $T_S$ remains constant ($T_{LS}$ will increase by the same amount that $T_{HS}$ decreases, or $T_{LS}$ will decrease by the same amount that $T_{HS}$ increases).

In order to avoid large overshoots during Ultrasonic mode, the high-side on-time is saturated. Due to the above conditions for entering Ultrasonic mode, if the load remains constant during the transition, a high-side on-time no larger than $DT_S$ is required. If $T_{HS}$ is allowed to grow much larger, large overshoots may occur during mode transitions or load transients. To prevent overshoots from occurring, $T_{HS}$ is saturated as follows for a buck converter:

$$T_{HS} < DT_S + T_{USoffset} \quad (12)$$

An offset, $T_{USoffset}$, is added in order to account for any potential quantization errors when measuring the input voltage, and also to provide hysteresis between Ultrasonic and Frequency Targeting modes. To maintain an accurate value of D, $V_{in}$ is measured and fed through the LUT before each pulse is sent.

Once the pulse size has been calculated, the values are sent to the Pulse Generator to produce a pulse of the appropriate width. Then the controller will wait for a period of ($1/f_{pmin}$) and the process repeats itself. As shown in FIG. 5, the ultrasonic pulse has a form similar to a traditional PFM pulse (a high-side pulse is sent, followed by a low-side pulse). Optionally, the high-side can be turned on again after the low-side turns off to avoid diode conduction in the high-side switch due to the negative inductor current, in order to improve efficiency. Dead-time should be included between the high-side and low-side pulses to avoid shoot-through and improve efficiency. As a result of this control method, the length of the high-side pulses will not be constant during steady-state operation (when the load current is fixed) since the high-side on-time will always either increase or decrease each cycle depending on the comparator output. In this case the length of the high-side pulses dither slightly in order to achieve an output voltage level with a DC value approximately equal to $V_{ref+}$.

Often, $T_{HS}$ will be smaller than its steady-state value, $DT_S$ (for a buck converter), during Ultrasonic mode. As a result, when the low-side switch turns off, the inductor current, $I_L$, is negative. At this point, the current flows through the high-side switch diode until it reaches zero. By decreasing the size of $T_S$, the net energy delivered to the output of the power stage for each pulse is reduced.

In practical applications the load current, $I_{LOAD}$, will not be fixed. However, the controller will dynamically compensate for any load changes by varying $T_{HS}$ during Ultrasonic mode, and will transition between Ultrasonic mode and Frequency Targeting mode as required. As mentioned above, $T_{HS}$ is saturated during Ultrasonic mode. If the load increases during Ultrasonic mode, $T_S$ and the maximum value of $T_{HS}$ may be inadequate to maintain the output voltage. In such a case, $V_{out}$ will dip. The controller continuously monitors the $V_{ref}$ comparator. If $V_{out}$ drops below $V_{ref}$, the controller will transition back into Frequency Targeting mode, where the switching frequency is allowed to increase. However, the controller ignores the triggering of the comparator during the mode transition dead-zone after each Ultrasonic pulse is sent. This is done in case switching noise causes the converter to trigger, which would otherwise inadvertently bring the controller back into Frequency Targeting mode.

Since the controller 102 can produce pulses with reduced net current, it is capable of regulating the output voltage with a fixed switching frequency above the audible band for any load current equal or greater than zero (and also when the load current is slightly negative). This makes it a suitable solution for users who want the benefit of high efficiency at light loads resulting from PFM operation, but who also require the switching frequency to be above the audible range.

The controller 102 has a feature where forced pulses can be sent to guarantee that $f_p$ is always above $f_{pmin}$, even during the transition from Frequency Targeting mode to Ultrasonic mode. This feature is only useful when Ultrasonic mode is enabled. When the forced pulse feature is enabled and the controller is operating in Frequency Targeting mode, PFM pulses will be sent at intervals of at most ($1/f_{pmin}$), even if the comparator has not triggered. In such a case, $T_S$ will be decreased like in the case where the controller 102 waits until the comparator triggers and $f_p$ is below the desired band. This may result in $V_{out}$ increasing above $V_{ref}$. However, if the load is very light, the controller will eventually enter Ultrasonic mode, where the voltage is regulated to $V_{ref+}$, and a voltage above $V_{ref}$. This will have the effect of always guaranteeing a switching frequency of at least $f_{pmin}$ during PFM operation. The output voltage may increase above $V_{ref}$, but the increase will be limited once the controller enters Ultrasonic mode.

When using this control method with Ultrasonic mode enabled, $T_{Smin}$ must be set large enough such that there is enough margin for $T_{HS}$ to be decreased so to bring the net average current to zero for the entire input voltage range. An alternative approach is to use a minimum value for the high-side on-time, $T_{HSmin}$. When $T_{HS}$ saturates to $T_{HSmin}$ in Frequency Targeting mode, the controller would transition to Ultrasonic mode. In this case $T_{HS}$ would remain constant in Ultrasonic mode assuming a constant input voltage ($T_{HS}$ would still need to be adjusted for input voltage variations). $T_{LS}$ would be modulated in Ultrasonic mode (at the start of each cycle $T_{LS}$ is increased if $V_{out}$ is greater than $V_{ref+}$ and $T_{LS}$ is reduced if $V_{out}$ is smaller than $V_{ref+}$). This alternative approach would extend the load current range during which Frequency Targeting mode is active. A third alternative for Ultrasonic mode would be to vary $T_{HS}$ while keeping $T_{LS}$ constant. All three of these options allow for the net average current sent to the output to be equal to zero or less while the switching frequency remains constant.

Much of the controller's parameters and functionality can be modified by programming register values. This allows the design to be usable in a wide variety of applications. A list of exemplary programmable registers is shown in Table 1.

TABLE 1

Programmable register descriptions

| Register Name | Description |
| --- | --- |
| $V_{ref}$ | The output voltage reference. |
| $V_{ref+}$ | The reference for the upper comparator that is slightly above the output voltage reference. Used for regulation during Ultrasonic mode. |
| $T_{DZ}$ | The pulse dead zone. |
| $k_{neg}$ and $k_{pos}$ | The multipliers for decreasing and increasing the pulse size during frequency targeting mode. |
| $T_{Smax}$ and $T_{Smin}$ | The maximum and minimum values for the total of the high-side and low-side on-times. |
| $f_{pmin}$ | The low end of the desired frequency band. |
| $f_{pmax}$ | The high end of the desired frequency band. |
| $EN_{freq\_tar}$ | The enabling or disabling of Frequency Targeting mode. |
| $EN_{force}$ | The enabling or disabling of forced pulses. |
| $EN_{US}$ | The enabling or disabling of Ultrasonic mode. |
| $T_{HSmin}$ | The minimum high-side on-time during Ultrasonic mode. |
| $T_{USinc}$ | The increment used for varying the high-side on-time during Ultrasonic mode. |
| $T_{USoffset}$ | The offset when saturating $t_{HS}$ during Ultrasonic mode. |

The system provides a means for the load current to be estimated during PFM operation, which can be useful for monitoring purposes. In a controller that dynamically shifts between PFM and PWM operation, the output of the Load Current Estimator 126 could also be used to determine when to transition from PFM to PWM mode. The Load Current Estimator 126 has inputs corresponding to the current operating conditions from the Digital Logic Block 104. These inputs include $T_S$, $T_{HS}$, $f_p$, L, $V_{in}$, $V_{out}$, and whether the controller is in Frequency Targeting mode or Ultrasonic mode. The Load Current Estimator can be implemented as a look-up table. The values for the look-up table can be calculated assuming ideal and nominal conditions. For example, for Frequency Targeting mode the look-up table entries can be calculated as follows according to equation (11) for a buck converter:

$$I_{LOAD} = \frac{V_{out} T_s^2 (V_{in} - V_{out})}{2 L V_{in} f_p} \quad (13)$$

A digital filter can be included for averaging the load current over a long period of time so that cycle-by-cycle variations do not cause high frequency variations in the output value. Since all the inputs are either fixed values or already available inside the Digital Logic Block 104, this block is able to provide an estimation of the load current with minimal additional hardware.

Embodiments are designed to be used inside digital controllers for switch-mode power supplies that employ PFM control where it is desired to maintain the PFM switching frequency within a specified frequency band. The invention could also be used in any application of pulse-frequency modulation where operation inside a limited frequency band is required.

The control method allows the pulse sizes to be dynamically adjusted in order to achieve a switching frequency within a desired range. The input voltage measurements can be used to adjust the high-side and low-side on-time so that the low-side turns off near the inductor current zero crossing point. The high-side and low-side pulse widths can be proportionately modulated during Frequency Targeting mode.

The saturation of pulse sizes can ensure that pulses of a minimum width are always sent to the driver and can limit the maximum size of the pulse in order to limit the output voltage ripple.

Two comparators 112 and 114 can be used to transition between Frequency Targeting and Ultrasonic modes.

The forcing of pulses during Frequency Targeting mode can ensure that a minimum switching frequency is always achieved. A fixed PFM switching frequency and the modulation of the size of the high-side pulse can be used in order to vary the net charge delivered to the output of the power stage during Ultrasonic mode.

A mode transition dead-zone in Ultrasonic mode can avoid the case where switching noise may inadvertently bring the controller back to Frequency Targeting mode.

The controller 104 allows converters to operate within a desired frequency band, eliminating audible noise and increasing system efficiency. Users do not need to sacrifice PFM operation in order to achieve an ultrasonic switching frequency. The design is highly programmable allowing it to be used in a wide variety of applications. An estimation of the load current is provided with minimal additional hardware. The zero crossing point of the inductor current does not need to be detected to produce proper PFM pulses due to the input voltage measurement and subsequent calculations.

The foregoing description of preferred embodiments of the present invention has been provided for the purposes of illustration and description. It is not intended to be exhaustive or to limit the invention to the precise forms disclosed. Many embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the claims and their equivalents.

The invention claimed is:

1. A digital pulse controller comprising:
digital logic to send pulses to the high side and low side switches of a switch-mode power supply converter, the digital logic allowing for a pulse frequency mode which includes a frequency targeting mode and an ultrasonic mode, the ultrasonic mode being switched into when the frequency of the pulses is at or below a frequency threshold and a total on-time of the pulses reaches a minimum threshold;
wherein during the frequency targeting mode if the frequency is within an acceptable range, the frequency is adjusted without changing the total on-time of the pulse, and wherein if the frequency is at or below the frequency threshold, but the total on-time is above the minimum threshold the total on time of the pulses is reduced; and
wherein during the ultrasonic mode the total on-time of the pulses is kept fixed at the minimum threshold and the ratio of the high-side pulse on-time to low-side pulse on-time is adjusted to control an output voltage.

2. The digital pulse controller of claim 1, wherein ultrasonic mode is a selectable mode and the ultrasonic mode is only switched into when the ultrasonic mode is enabled.

3. The digital pulse controller of claim 1, wherein, in the ultrasonic mode, in some cases, the pulse for the low side switch is on long enough for the inductor current to be negative when the low side switch is turned off.

4. The digital pulse controller of claim 1, wherein the frequency targeting mode uses the high side and low side pulses such that the inductor current is positive and goes to zero at the end of the low side pulse.

5. The digital pulse controller of claim 4, wherein an input voltage is sampled to ensure that the on times of the high side and low side pulses will result in the inductor current going to zero at the end of the low side pulse.

6. The digital pulse controller of claim 1, wherein, in the frequency targeting mode, as the load increases, the total pulse on time of the high side and low side pulses ($T_S$) increases to maintain frequency below upper frequency ($f_{pmax}$) and, as the load decreases, $T_S$ decreases to maintain frequency above a lower frequency ($f_{pmin}$) until $T_S$ saturates to a minimum allowable value.

7. The digital pulse controller of claim 1, wherein the pulse sizes are saturated between a minimum and a maximum value.

8. The digital pulse controller of claim 1, wherein data on the measured switching frequency and pulses sizes are used to estimate the load current.

9. The digital pulse controller of claim 1, wherein a pulse dead zone is used following the generation of each switching pulse to avoid sending a subsequent pulse too quickly.

10. The digital pulse controller of claim 1, further comprising a Pulse Frequency Modulator (PFM) comparator comparing a switch-mode power supply output voltage to a first reference voltage and a ultrasonic mode comparator comparing the switch-mode power supply output voltage to a second higher reference voltage.

11. The digital pulse controller of claim 10, wherein the digital pulse controller goes into the frequency targeting mode from the ultrasonic mode when the PFM comparator shows that the output voltage is less than the first reference voltage.

12. The digital pulse controller of claim 10, wherein, in frequency targeting mode, an interval between pulses is measured, and if the interval is found to the within a desired frequency band, the pulse size remains the same for the following switching cycle, if the interval is found to be below the desired frequency band, the pulse size is decreased for the following switching cycle, if the interval is found to be above the desired frequency band, the pulse size is increased for the following switching cycle.

13. The digital pulse controller of claim 10, wherein the ultrasonic mode comparator is used to adjust a ratio of the high side pulse on-time to the low side pulse on-time in the ultrasonic mode.

14. The digital pulse controller of claim 13, wherein the switch-mode power supply converter is a buck converter and, in the ultrasonic mode, if the output voltage is above the second reference voltage, the ratio is decreased and if the output voltage is below the second reference voltage, the ratio is increased.

15. The digital pulse controller of claim 13, wherein the switch-mode power supply converter is a boost converter and, in the ultrasonic mode, if the output voltage is above the second reference voltage, the ratio is increased and if the output voltage is below the second reference voltage, the ratio is decreased.

16. The digital pulse controller of claim 13, wherein the ratio is adjusted by changing the high side on time while leaving the total on time constant.

17. The digital pulse controller of claim 13, wherein the ratio is adjusted by changing the high side on time while leaving the low side on time constant.

18. The digital pulse controller of claim 13, wherein the ratio is adjusted by changing the total on time while leaving the high side on time constant.

19. The digital pulse controller of claim 10, further comprising a pulse width modulation (PWM) comparator that is used to compare the output voltage to a third reference voltage that is less than the first reference voltage.

20. The digital pulse controller of claim 10, wherein the PFM comparator is used to initiate pulses in the frequency targeting mode.

21. The digital pulse controller of claim 1, wherein frequency thresholds are used to keep the frequency of the pulses such that the pulses do not cause an audible sound and is also below a specified frequency.

22. The digital pulse controller of claim 1, wherein, in the frequency targeting mode there is a force pulse operation, in the force pulse operation, a pulse is forced when the time period corresponding to the minimum frequency of the desired switching frequency band is reached.

23. The digital pulse controller of claim 22, wherein the force pulse operation is selectable.

24. The digital pulse controller of claim 1, wherein a ratio of the high side pulse on-time to low side pulse on-time is kept fixed in the frequency targeting mode for a fixed input voltage, the ratio is updated as the input voltage changes.

25. The digital pulse controller of claim 1, wherein a total pulse on time ($T_S$) is maintained to be greater than a minimum width.

26. The digital pulse controller of claim 1, wherein a mode transition dead zone time is used to prevent the mode from switching to the frequency targeting mode from the ultrasonic mode during the dead zone time after the pulses are sent to the high and low side switches.

27. The digital pulse controller of claim 26, wherein the mode transition dead zone time is selectable.

* * * * *